US008817130B2

(12) United States Patent
Yoshino et al.

(10) Patent No.: US 8,817,130 B2
(45) Date of Patent: Aug. 26, 2014

(54) AUTO WHITE BALANCE ADJUSTMENT SYSTEM, AUTO WHITE BALANCE ADJUSTMENT METHOD, AND CAMERA MODULE

(75) Inventors: Akira Yoshino, Tokyo (JP); Keiichiro Yanagida, Tokyo (JP); Noriko Matsuo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 13/611,688

(22) Filed: Sep. 12, 2012

(65) Prior Publication Data

US 2013/0155274 A1 Jun. 20, 2013

(30) Foreign Application Priority Data

Dec. 16, 2011 (JP) ................... 2011-275640

(51) Int. Cl.
*H04N 9/73* (2006.01)
(52) U.S. Cl.
USPC ...................................... 348/223.1

(58) Field of Classification Search
USPC ...................................... 348/223.1
See application file for complete search history.

(56) References Cited

FOREIGN PATENT DOCUMENTS

JP    2008-5540    1/2008

*Primary Examiner* — Roberto Velez
*Assistant Examiner* — Stephen Coleman
(74) *Attorney, Agent, or Firm* — Oblon, Spivak, McClelland, Maier & Neustadt, L.L.P.

(57) ABSTRACT

According to one embodiment, a white balance fine adjustment starting instruction unit determines whether to start fine adjustment in white balance using a first threshold value. The white balance fine adjustment starting instruction unit determines whether to keep on performing the fine adjustment using a second threshold value. The second threshold value is set for the fine adjustment based on a second color judgment gate. The second color judgment gate defines the range of a target color temperature in white balance adjustment for each light source.

20 Claims, 8 Drawing Sheets

AUTO WHITE BALANCE ADJUSTMENT SYSTEM, AUTO WHITE BALANCE ADJUSTMENT METHOD, AND CAMERA MODULE

CROSS-REFERENCE TO RELATED APPLICATIONS

This application is based upon and claims the benefit of priority from Japanese Patent Application No. 2011-275640, filed on Dec. 16, 2011; the entire contents of all of which are incorporated herein by reference.

FIELD

Embodiments disclosed herein relate generally to an auto white balance adjustment system, an auto white balance adjustment method, and a camera module.

BACKGROUND

In general, an image pickup apparatus performs white balance adjustment according to a color temperature of a light source. For example, when irradiated under a fluorescent lamp, a white object may be tinged with green, the reflected color. In addition, when irradiated under an incandescent lamp, the white object may be tinged with red, the reflected color. The image pickup apparatus corrects a tone of color through the white balance adjustment such that the object is captured of its image having the original color under this situation. An example of a system which automatically performs the white balance adjustment is an auto white balance adjustment (AWB) system.

The AWB system sets the range of a target color temperature of the white balance adjustment as a color judgment gate. The color judgment gate is a reference for sorting portions, which are originally achromatic colors but tinged with colors under the influence of light, from portions of chromatic colors. The AWB system integrates pixel data sorted based on the color judgment gate for every frame and divides the integration data by the number of integration target pixels, thereby calculating an average value of the pixel data per pixel of each frame. For example, in a case integrating color difference signals, the AWB system obtains a white balance gain to make the calculated average value zero and performs the white balance adjustment. According to a system in the related art, the color judgment gate is set to include various kinds of light source colors from a light source with a low color temperature to a light source with a high color temperature. In this setting, even colors other than the light source color may be included in the sorting target of the color judgment gate. For example, when a colored object with a low chroma such as blue or cyan is captured of its image under the incandescent lamp, since the red of the incandescent lamp and the blue of the object cancel each other out, it looks as if the object is tinged with the achromatic color, so that the object may be considered as one of which the color falls within the range of the color judgment gate. In this example, the white balance adjustment is performed in a state where a slight redness remains. In this way, since the portions tinged with colors other than the light source color are included in the integration target, the white balance adjustment is performed but the ideal white is not accomplished.

DETAILED DESCRIPTION

Figure 1:
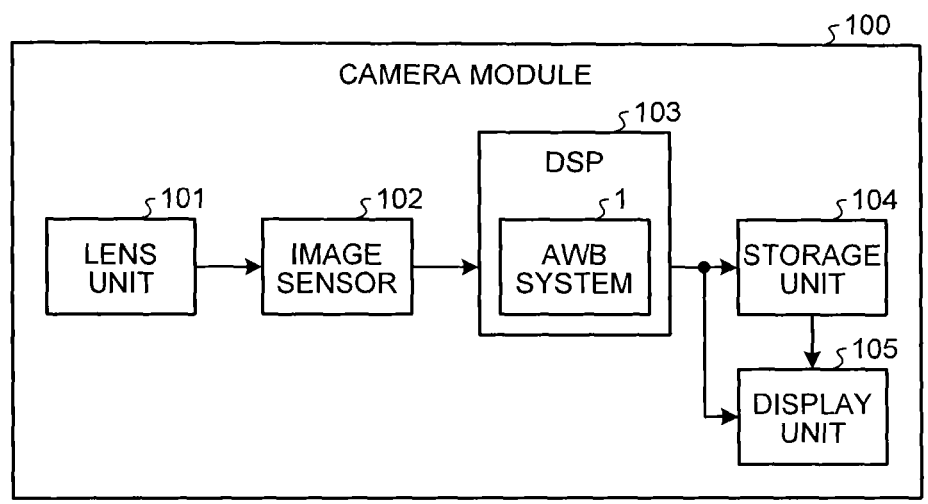
FIG. 1 is a block diagram illustrating a schematic configuration of a camera module to which an AWB system is applied according to a first embodiment.
Figure 2:
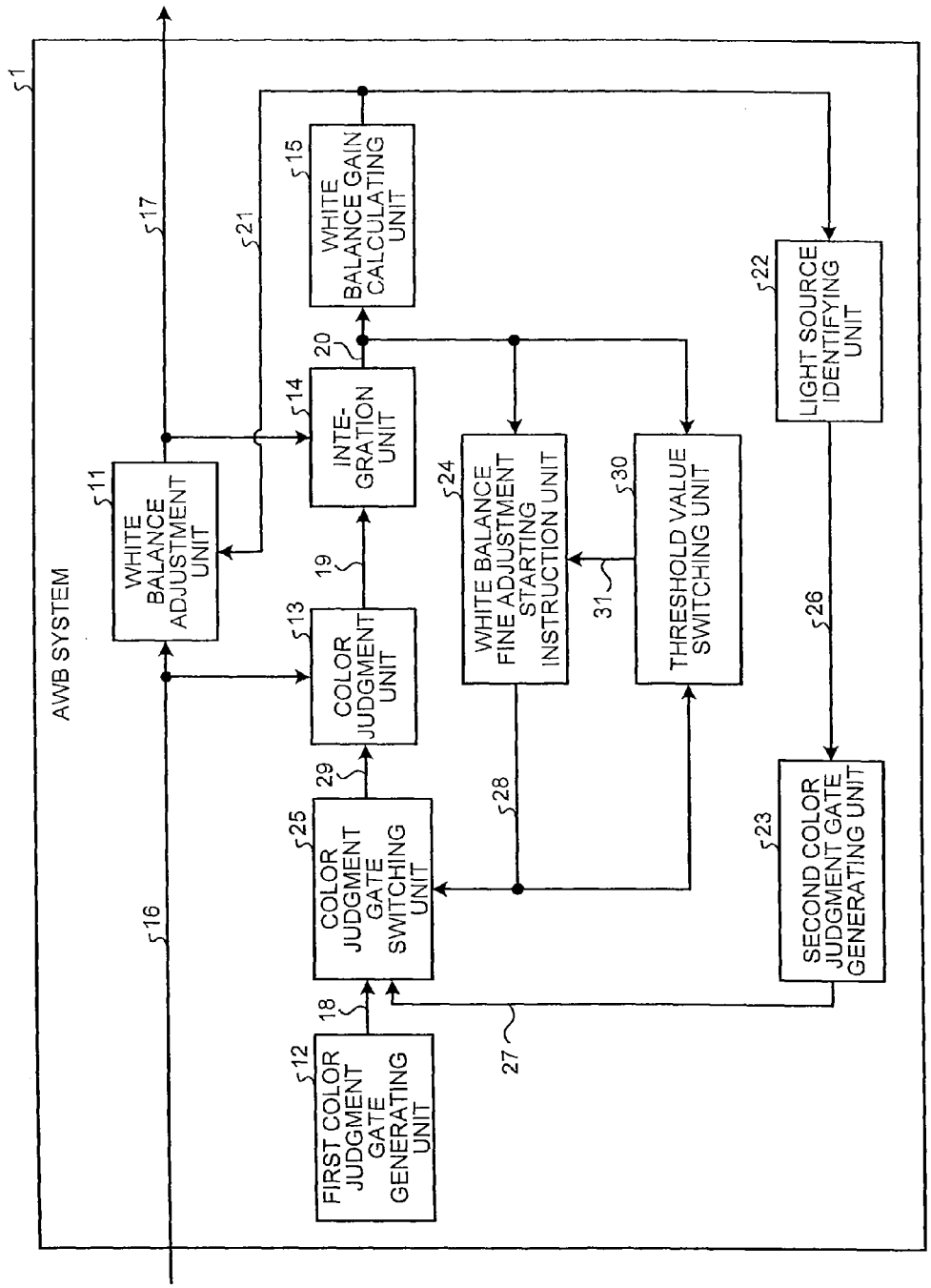
FIG. 2 is a block diagram illustrating of a configuration of an AWB system.
Figure 3:
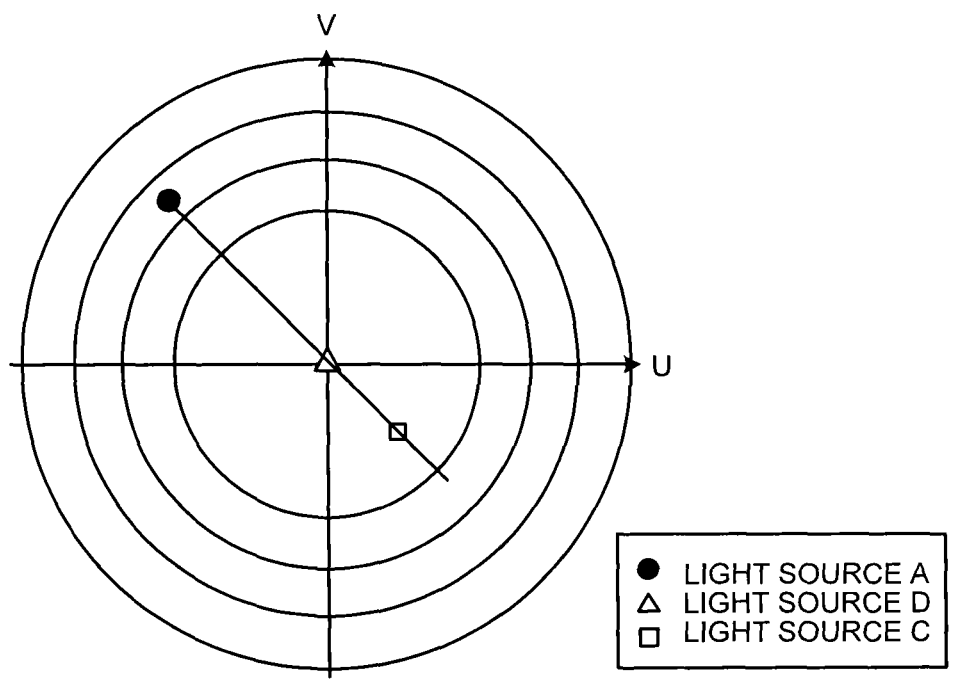
FIG. 3 is a diagram illustrating an example of a color temperature locus distribution in a color space.
Figure 4:
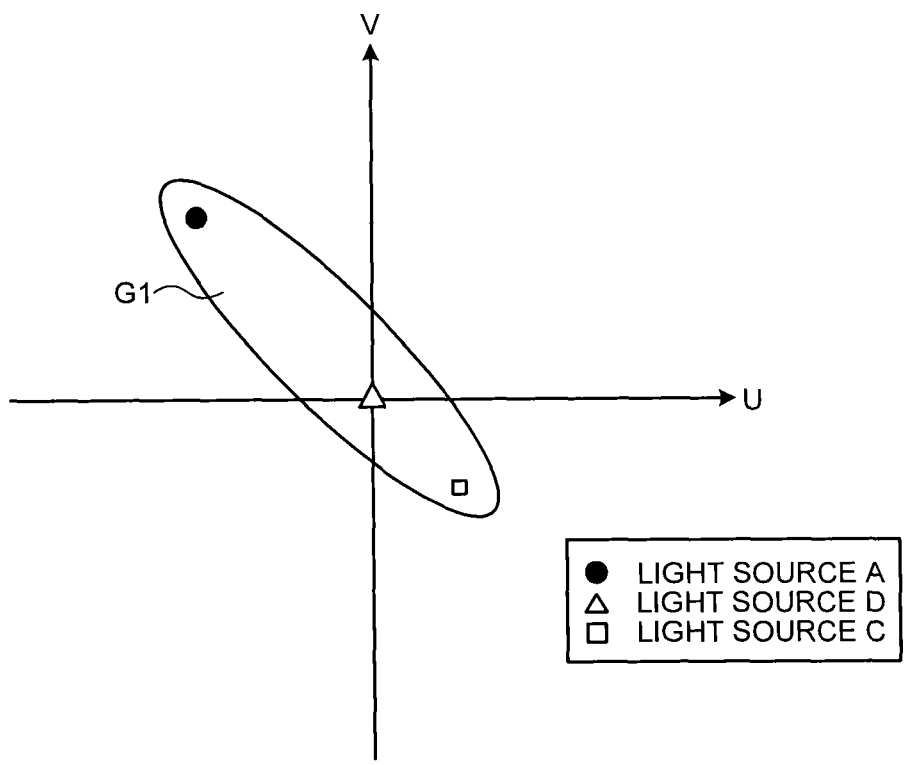
FIG. 4 is a diagram for explaining an example of setting a first color judgment gate.
Figure 5:
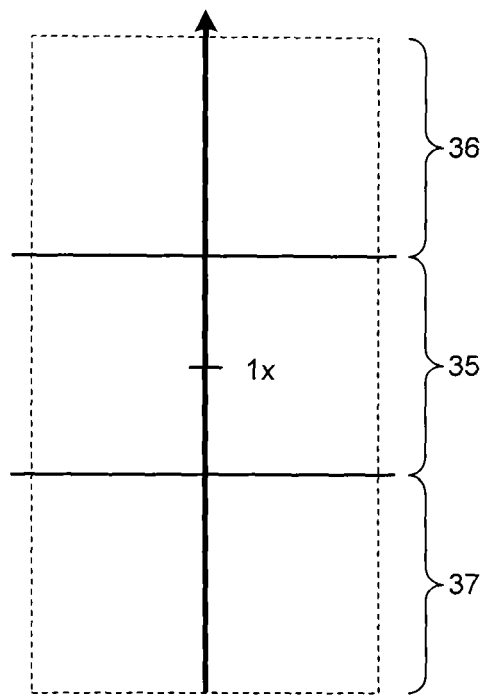
FIG. 5 is a diagram for explaining an exemplary method of identifying a light source in a light source identifying unit.
Figure 6:
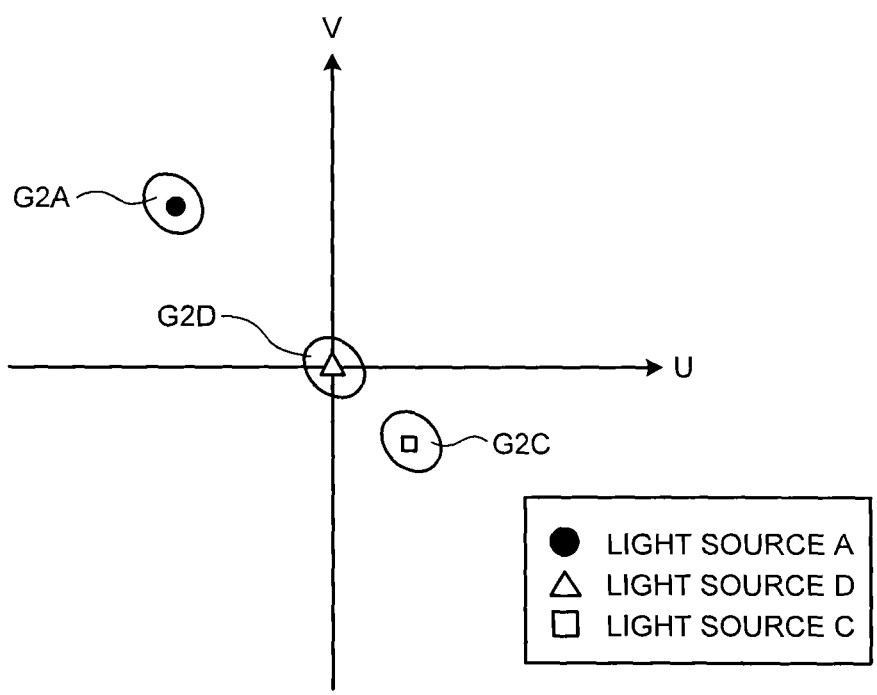
FIG. 6 is a diagram for explaining an example of setting a second color judgment gate.
Figure 7:
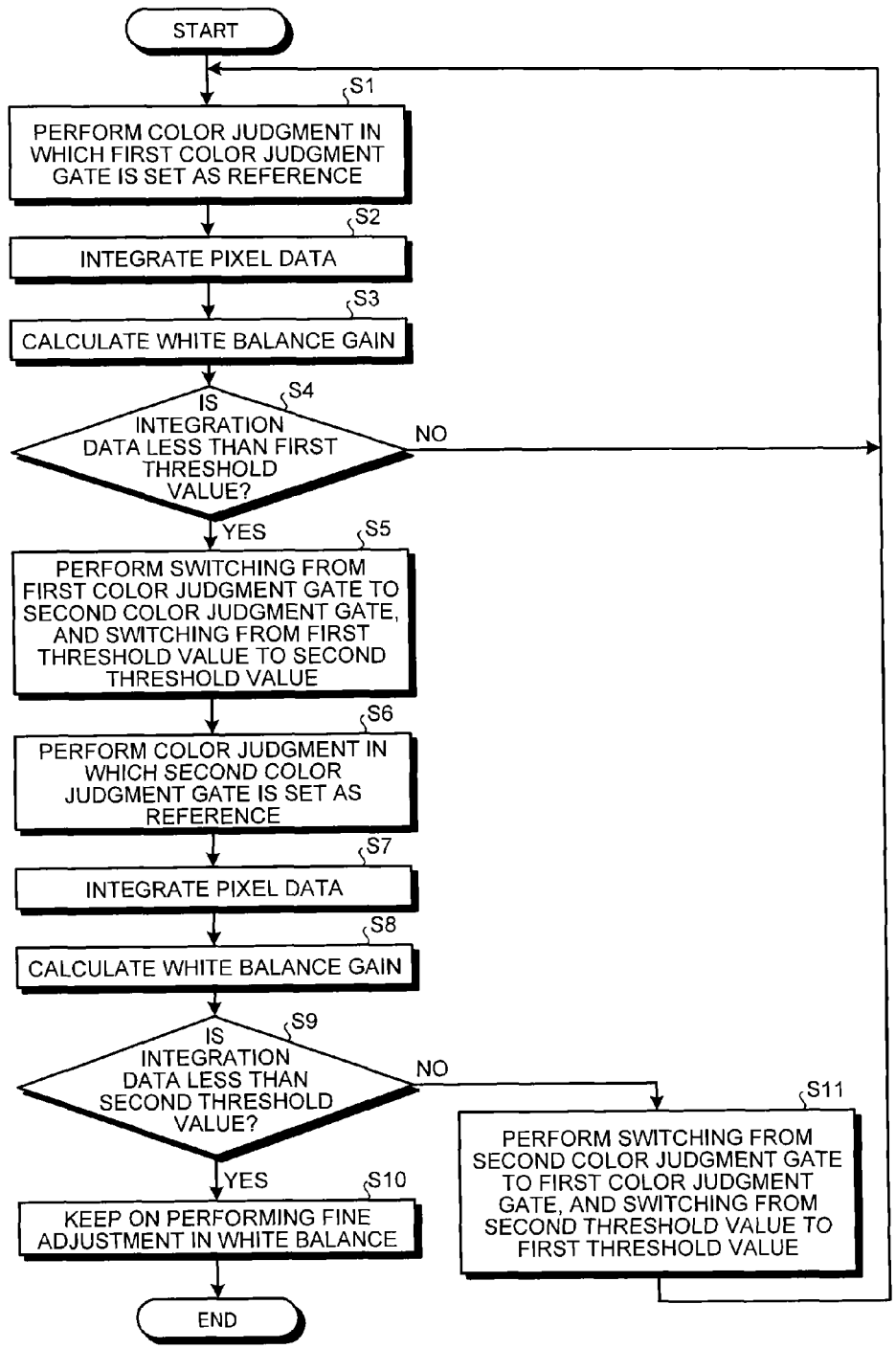
FIG. 7 is a flowchart illustrating of an operation sequence of an AWB system.
Figure 8:
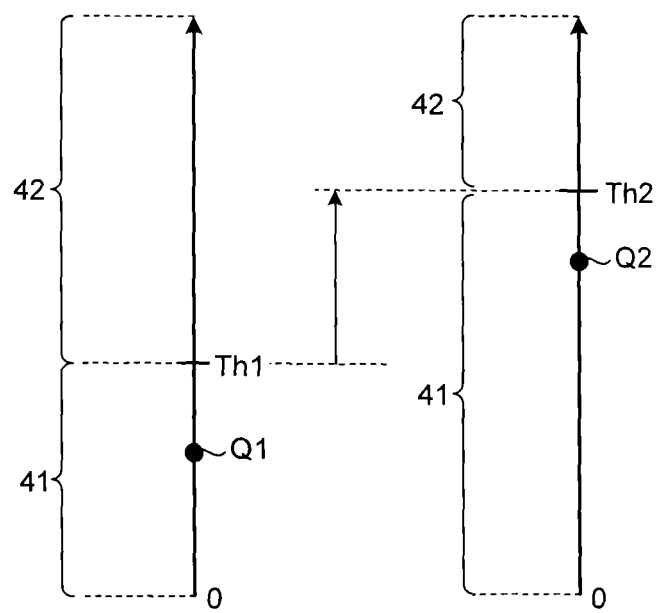
FIG. 8 is a conceptual diagram illustrating a relation between integration data and threshold values in an AWB system according to the first embodiment.
Figure 9:
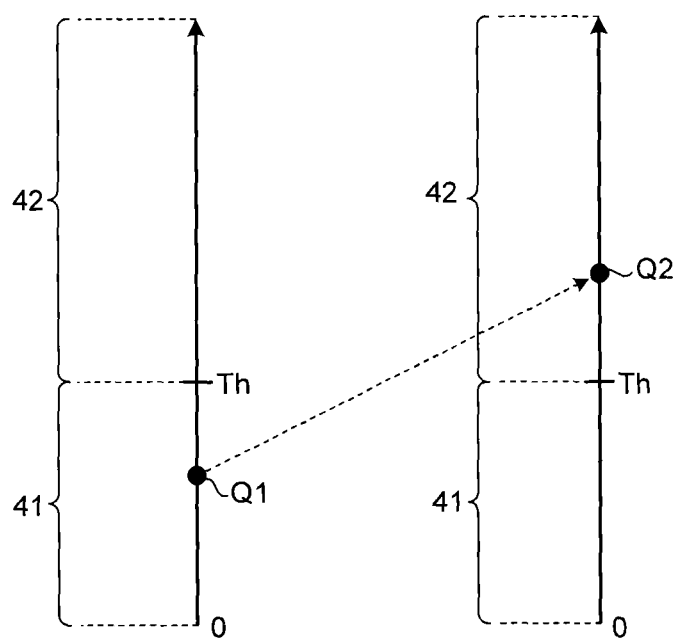
FIG. 9 is a conceptual diagram illustrating a relation between the integration data and the threshold value in the AWB system according to a comparative example of the first embodiment.

In general, according to one embodiment, an auto white balance adjustment system includes a white balance adjustment unit, a color judgment unit, an integration unit, a first color judgment gate generating unit, a second color judgment gate generating unit, a white balance fine adjustment starting instruction unit, and a color judgment gate switching unit. The white balance adjustment unit performs white balance adjustment on an image signal. The white balance adjustment is based on a white balance gain. The color judgment unit performs color judgment targeting the image signal to sort pixel data used for calculating the white balance gain. The integration unit integrates the sorted pixel data in the color judgment unit. The integration unit outputs the integration data. The first color judgment gate generating unit generates a first color judgment gate. The first color judgment gate defines the entire range of a target color temperature in the white balance adjustment. The second color judgment gate generating unit generates a second color judgment gate. The second color judgment gate defines the range of the target color temperature in the white balance adjustment for each light source which is identified according to the white balance gain. The white balance fine adjustment starting instruction unit makes an instruction to start fine adjustment in white balance. For the fine adjustment in the white balance, the second color judgment gate is set as a reference for the color judgment. The color judgment gate switching unit performs the switching of the reference for the color judgment in the color judgment unit from the first color judgment gate to the second color judgment gate. The color judgment gate switching unit performs the switching of the reference for the color judgment in response to the instruction caused by the white balance fine adjustment starting instruction unit. The white balance fine adjustment starting instruction unit determines whether to start the fine adjustment depending on the comparison result of a first threshold value with the integration data. The first threshold value is set for the white balance adjustment based on the first color judgment gate. The white balance fine adjustment starting instruction unit determines whether to keep on performing the fine adjustment depending on the comparison result of a second threshold value with the integration data. The second threshold value is set for the fine adjustment based on the second color judgment gate. Hereinbelow, an auto white balance adjustment system, an auto white balance adjustment method, and a camera module according to embodiments will be described in detail with reference to the accompanying drawings. Further, the invention is not limited to the embodiments. FIG. 1 is a block diagram illustrating a schematic configuration of the camera module to which an AWB system is applied according to a first embodiment. The camera module 100, for example, is a digital camera. The camera module 100 may be an electronic apparatus other than the digital camera, for example, a camera-equipped mobile terminal or the like. The camera module 100 includes a lens unit 101, an image sensor 102, a digital signal processor (DSP) 103, a storage unit 104, and a display unit 105. The lens unit 101 receives light reflected from an object, and forms an object image in the image sensor 102. The image sensor 102 converts the light received through the lens unit 101 into signal charges, and captures the object image. The image sensor 102 receives signal values of red (R), green (G), and blue (B) in an order corresponding to a Bayer array to generate an analog signal, and converts the received analog signal into a digital signal. The DSP 103 performs various kinds of processes on the image signal obtained from the image sensor 102. The DSP 103 serves as an image processing apparatus. The DSP 103 is provided with an AWB system 1. The AWB system 1 performs the white balance adjustment on the image signal. In addition, the DSP 103 performs, for example, auto exposure adjustment, matrix processing, edge enhancement, luminance compression, gamma processing, and the like on the image signal. The storage unit 104 stores the image which has been subjected to the signal processing in the DSP 103. The storage unit 104 outputs the image signal to the display unit 105 in response to a user's operation or the like. The display unit 105 displays the image according to the image signal which is input from the DSP 103 or the storage unit 104. The display unit 105, for example, is a liquid crystal display. FIG. 2 is a block diagram illustrating a configuration of the AWB system. The AWB system 1 includes a white balance adjustment unit 11, a first color judgment gate generating unit 12, a color judgment unit 13, an integration unit 14, a white balance gain calculating unit 15, a light source identifying unit 22, a second color judgment gate generating unit 23, a white balance fine adjustment starting instruction unit 24, a color judgment gate switching unit 25, and a threshold value switching unit 30. The white balance adjustment unit 11 performs the white balance adjustment on the image signal based on the white balance gain. The white balance adjustment unit 11 multiplies an image signal 16, which is not yet adjusted in the white balance, by a white balance gain 21. The white balance adjustment unit 11 outputs the multiplication result as an image signal 17 which has been adjusted in the white balance. The color judgment unit 13 performs the color judgment targeting the image signal 16 which is not yet adjusted in the white balance. The color judgment unit 13 performs the color judgment on every pixel to sort the pixel data (the signal value) used for calculating the white balance gain 21. The color judgment unit 13 outputs the sorting result of the pixel data as an integration target pixel signal 19. The integration unit 14 integrates the pixel data corresponding to the integration target pixel signal 19 for a frame of the image signal 17 which has been adjusted in the white balance. The integration unit 14 outputs the integration result of the pixel data as integration data 20. The integration data 20 is data regarding the integration, for example, including the integration value of the pixel data and the number of pixels used in the integration, or the average value of the pixel data per pixel. The average value of the pixel data per pixel is obtained by dividing the integration value by the number of the pixels used in the integration. The white balance gain calculating unit 15 calculates the white balance gain 21 based on the integration data 20. The AWB system 1 uses the white balance gain 21, calculated from the pixel data of a frame, for the white balance adjustment of the image signal 16 in the next frame. The light source identifying unit 22 identifies a light source to be used in capturing according to the white balance gain 21 obtained from the white balance gain calculating unit 15. The light source identifying unit 22 outputs the result of identifying a light source as a light source identifying signal 26. The first color judgment gate generating unit 12 generates the first color judgment gate, and outputs a first color judgment gate signal 18. The first color judgment gate is used to define the entire range of the target color temperature in the white balance adjustment performed by the AWB system 1. The second color judgment gate generating unit 23 generates the second color judgment gate for each of the light sources which are identified by the light source identifying unit 22. The second color judgment gate is used to define the range of the target color temperature in the white balance adjustment for each of the light sources which is identified according to the white balance gain 21. The second color judgment gate generating unit 23 selects the second color judgment gate corresponding to the light source identified by the light source identifying unit 22 according to the light source identifying signal 26, and outputs a second color judgment gate signal 27. The color judgment gate switching unit 25 selects any one of the first color judgment gate signal 18 and the second color judgment gate signal 27, and outputs the selected one as a color judgment gate signal 29. The color judgment gate switching unit 25 performs the switching between the first color judgment gate and the second color judgment gate to select one as a reference for the color judgment in the color judgment unit 13. The white balance fine adjustment starting instruction unit 24 outputs a white balance fine adjustment starting signal 28. The white balance fine adjustment starting signal 28 is used as a signal to make an instruction to start the fine adjustment in the white balance in which the second color judgment gate is set as the reference for the color judgment. For example, when it is confirmed that the integration value of the pixel data, which is the integration data 20, is lower than a predetermined threshold value, the white balance fine adjustment starting instruction unit 24 outputs the white balance fine adjustment starting signal 28. When the white balance fine adjustment starting signal 28 is input, the color judgment gate switching unit 25 performs the switching of the color judgment gate signal 29 from the first color judgment gate signal 18 to the second color judgment gate signal 27. The threshold value switching unit 30 outputs a threshold value signal 31 to the white balance fine adjustment starting instruction unit 24. The threshold value signal 31 is used as a signal representing a threshold value used for the comparison with the integration data 20 in the white balance fine adjustment starting instruction unit 24. The threshold value switching unit 30 performs the switching between the first threshold value and the second threshold value, which are used as the threshold value signal 31, according to the white balance fine adjustment starting signal 28. The first threshold value is used as a threshold value which is set for the white balance adjustment based on the first color judgment gate. The second threshold value is used as a threshold value which is set for the fine adjustment in the white balance based on the second color judgment gate. The second threshold value is set to a value higher than the first threshold value. The threshold value switching unit 30, for example, holds the first threshold value and the second threshold value in advance. FIG. 3 is a diagram illustrating an example of a color temperature locus distribution in a color space. In the graph, the horizontal axis represents a color difference signal U, and the vertical axis represents a color difference signal V. The embodiment represents an example in which Light source A, Light source D, and Light source C are assumed to be provided such that the light source colors thereof are plotted on a straight line in a UV coordinate system. Light source A, Light source D, and Light source C are assumed as the standard light sources having the color temperatures about 2800 K, about 6500 K, and about 6800 K, respectively. FIG. 4 is a diagram for explaining an example of setting of the first color judgment gate. The first color judgment gate G1 is set such that the color ranges of any of Light source A, Light source D, and Light source C as the target light sources of the white balance adjustment performed by the AWB system 1 are collectively included therein. FIG. 5 is a diagram for explaining an exemplary method of identifying a light source in the light source identifying unit. The light source identifying unit 22 identifies any one of Light source A, Light source D, and Light source C, for example, based on the magnitude of Gain R which is the white balance gain 21. For example, in a case where Gain R is included in a predetermined range 35 around the gain 1x, the light source identifying unit 22 identifies Light source D. In a case where Gain R is included in a range 36 larger than the upper limit of the range 35, the light source identifying unit 22 identifies Light source C. In a case where Gain R is included in a range 37 smaller than the lower limit of the range 35, the light source identifying unit 22 identifies Light source A. FIG. 6 is a diagram for explaining an example of setting the second color judgment gate. The second color judgment gate generating unit 23 generates second color judgment gates G2A, G2D, and G2C with respect to Light source A, Light source D, Light source C, respectively. The second color judgment gate G2A for Light source A is set to have its center around the light source color of Light source A. The second color judgment gate G2D for Light source D is set to have its center around the light source color of Light source D. The second color judgment gate G2C for Light source C is set to have its center around the light source color of Light source C. The ranges of the color temperatures of the second color judgment gates G2A, G2D, and G2C are separated from each other so as to be set with intervals therebetween. The intervals between the ranges of the color temperatures of the second color judgment gates G2A, G2D, and G2C can be suitably set. The AWB system 1 is not limited to the configuration in which the second color judgment gates are applied with being associating with Light source A, Light source D, and Light source C to perform the fine adjustment in the white balance. The second color judgment gates may be set with being associated with other light sources except Light source A, Light source D, and Light source C. It may suffice that a plurality of light sources are provided to associate the second color judgment gates therewith, or any number of light sources except three may be employed. FIG. 7 is a flowchart illustrating an operation sequence of the AWB system. At the time of starting the white balance adjustment, the color judgment gate switching unit 25 outputs the first color judgment gate signal 18 as the color judgment gate signal 29. The color judgment unit 13 performs the color judgment in which the first color judgment gate is set as a reference (step S1). The color judgment unit 13 outputs the integration target pixel signal 19. The integration unit 14 integrates the pixel data corresponding to the integration target pixel signal 19 in the image signal 17 (step S2). When the pixel data of a frame is integrated, the integration unit 14 outputs the integration data 20. The white balance gain calculating unit 15 calculates the white balance gain 21 based on the integration data 20 (step S3). The white balance adjustment unit 11 multiplies the white balance gain 21 by the image signal 16. The light source identifying unit 22 identifies the light source according to the white balance gain 21. The white balance fine adjustment starting instruction unit 24 compares the integration data 20 obtained through the integration in step S3 with the first threshold value (step S4). In a case where the integration data 20 is less than the first threshold value (Yes in step S4), the white balance fine adjustment starting instruction unit 24 outputs the white balance fine adjustment starting signal 28. The color judgment gate switching unit 25 performs the switching from the first color judgment gate to the second color judgment gate according to the white balance fine adjustment starting signal 28 (step S5). The color judgment gate switching unit 25 applies the second color judgment gate, which is generated by the second color judgment gate generating unit 23, according to the light source identifying signal 26. The color judgment gate switching unit 25 outputs the second color judgment gate signal 27 as the color judgment gate signal 29. In this way, the AWB system 1 makes the phase of the white balance adjustment of the identified light source proceed from the normal adjustment to the fine adjustment. The white balance fine adjustment starting instruction unit 24 determines whether to start the fine adjustment in the white balance depending on the comparison result of the first threshold value with the integration data 20. In addition, the threshold value switching unit 30 performs the switching from the first threshold value to the second threshold value according to the white balance fine adjustment starting signal 28 (step S5). The threshold value switching unit 30 performs the switching from the first threshold value to the second threshold value based on the threshold value signal 31. In a case where the integration data 20 is not less than the first threshold value (No in step S4), the AWB system 1 applies the first color judgment gate even to the image signal 16 in the next frame, and repeats the procedure from step S1 to step S4. Following the switching of the color judgment gate and the switching of the threshold value in step S5, the color judgment unit 13 performs the color judgment on the image signal 16 in the next frame, in which the second color judgment gate is set as a reference (step S6). The integration unit 14 integrates the pixel data corresponding to the integration target pixel signal 19 in the image signal 17 (step S7). The white balance gain calculating unit 15 calculates the white balance gain 21 based on the integration data 20 (step S8). The white balance adjustment unit 11 multiplies the image signal 16 by the white balance gain 21. The light source identifying unit 22 identifies the light source according to the white balance gain 21. The white balance fine adjustment starting instruction unit 24 compares the integration data 20 obtained through the integration in step S3 with the second threshold value (step S9). In a case where the integration data 20 is not less than the second threshold value (No in step S9), the white balance fine adjustment starting instruction unit 24 turns off the white balance fine adjustment starting signal 28. The color judgment gate switching unit 25 performs the switching from the second color judgment gate to the first color judgment gate according to turning off the white balance fine adjustment starting signal 28 (step S11). In addition, the threshold value switching unit 30 performs the switching from the second threshold value to the first threshold value according to turning off the white balance fine adjustment starting signal 28 (step S11). The AWB system 1 applies the first color judgment gate even to the image signal 16 in the next frame, and repeats step S1 and the subsequent procedures. In a case where the integration data 20 is less than the second threshold value (Yes in step S9), the AWB system 1 applies the second color judgment gate even to the image signal 16 in the next frame, and keeps on performing the fine adjustment in the white balance (step S10). As long as the integration data 20 is less than the second threshold value, the AWB system 1 performs the white balance adjustment based on the assumption that the light source is not changed. The AWB system 1 monitors whether or not the integration data 20 is less than the second threshold value, while the fine adjustment in the white balance is kept on performing. When the integration data 20 is equal to or greater than the second threshold value, the AWB system 1 starts the white balance adjustment in which the first color judgment gate is applied. In this way, when the integration data 20 is equal to or greater than the second threshold value, the AWB system 1 considers that the light source is changed and makes the phase of the white balance adjustment go back from the fine adjustment to the normal adjustment. The white balance fine adjustment starting instruction unit 24 determines whether to keep on performing the fine adjustment depending on the comparison result of the second threshold value with the integration data 20. The AWB system 1 applies the second color judgment gate which has been prepared in advance for each light source to the fine adjustment in the white balance, so that the pixel data as an integration target can be sorted with high accuracy according to the light source which has been used in capturing the image. Since the AWB system 1 can make portions, which correspond to colors other than the light source color, excluded from the integration target with high accuracy, the white balance adjustment can be performed with high accuracy. FIG. 8 is a conceptual diagram illustrating a relation between integration data and threshold values in the AWB system according to the first embodiment. FIG. 9 is a conceptual diagram illustrating a relation between the integration data and the threshold value in the AWB system according to a comparative example of the first embodiment. In the comparative example illustrated in FIG. 9, the AWB system applies a constant threshold value Th regardless of the switching of the color judgment gate to determine the start or continuation of the fine adjustment in the white balance.

In both of FIG. 8 and FIG. 9, the case where the first color judgment gate is applied is illustrated on the left side and the case where the second color judgment gate is applied is illustrated on the right side in order to show transitions in relation between the integration data and the threshold value according to the switching of the color judgment gate. Immediately after the switching from the first color judgment gate collectively including the color ranges of the respective light sources to the second color judgment gate limited to the color range of a specific light source, pixels of which the pixel data becomes the integration target are limited. In some objects, the integration data obtained as the data per pixel may increase once in accordance with the switching from the first color judgment gate to the second color judgment gate, and then may shift to converge. In the comparative example illustrated in FIG. 9, when integration data Q1 in a frame is included in the range 41 less than the threshold value Th, the switching from the first color judgment gate to the second color judgment gate is assumed to have been performed. In accordance with the switching to the color judgment gate, the integration data in the next frame increases from Q1 to Q2. In a case where the integration data Q2 is included in the range 42 equal to or greater than the threshold value Th, the AWB system stops the fine adjustment in the color range of a specific light source and makes another adjustment targeting the entire color range performed newly, for example, even in a case where there is no change in the light source. Such as a replacement of the adjustment phase will be repeated as long as the relation of Q2>Th is satisfied in accordance with the switching of the color judgment gate. If the threshold value Th is set to a high value in advance to avoid the repetition, the AWB system will start the fine adjustment before the integration data Q1 converges sufficiently. In this case, it is difficult to perform the white balance adjustment with high accuracy. As illustrated in FIG. 8, in the embodiment, when the integration data Q1 in a frame is included in the range 41 less than a first threshold value Th1, the switching from the first color judgment gate to the second color judgment gate is assumed to have been performed. The threshold value switching unit 30 performs the switching from the first threshold value Th1 to a second threshold value Th2 in accordance with the switching from the first color judgment gate to the second color judgment gate. The white balance fine adjustment starting instruction unit 24 extends the threshold value which becomes the comparison target with the integration data Q1 and Q2 from the first threshold value Th1 to the second threshold value Th2 in accordance with the switching from the first color judgment gate to the second color judgment gate. Even if the integration data increases from Q1 to Q2 in accordance with the switching of the color judgment gate, the AWB system 1 applies the extended second threshold value Th2 to suppress the transition of the integration data Q2 in the range 42 equal to or greater than the second threshold value Th2. The AWB system 1 makes the integration data Q2 remain in the range 41 less than the second threshold value Th2 when the integration data Q2 increases which is not caused by the change in the light source. In the procedure illustrated in FIG. 7, the AWB system 1 suppresses the procedure of step S1 and the subsequent steps from being excessively repeated following the comparison between the integration data Q2 and the second threshold value Th2 (step S9) and the switching to the first color judgment gate (step S11). The AWB system 1 can effectively suppress the useless replacement in the phase of the white balance adjustment. The AWB system 1 can suppress the repeated transition between the phases, and thus makes the change smooth until the white balance converges. The AWB system 1 can make the change in an image smooth while the white balance adjustment is performed. The AWB system 1 can suppress the repeated transition between the phases, and thus it can be shorten the time taken for the convergence of the white balance. Therefore, the AWB system 1 can perform the white balance adjustment with high accuracy. The threshold value switching unit 30 is not limited to the case of outputting the predetermined first threshold value Th1 and the second threshold value Th2. The threshold value switching unit 30, for example, may output the second threshold value Th2 which has been obtained by calculation. The threshold value switching unit 30, for example, obtains the second threshold value Th2 by multiplying or adding the predetermined first threshold value Th1 and a coefficient.

Figure 10:
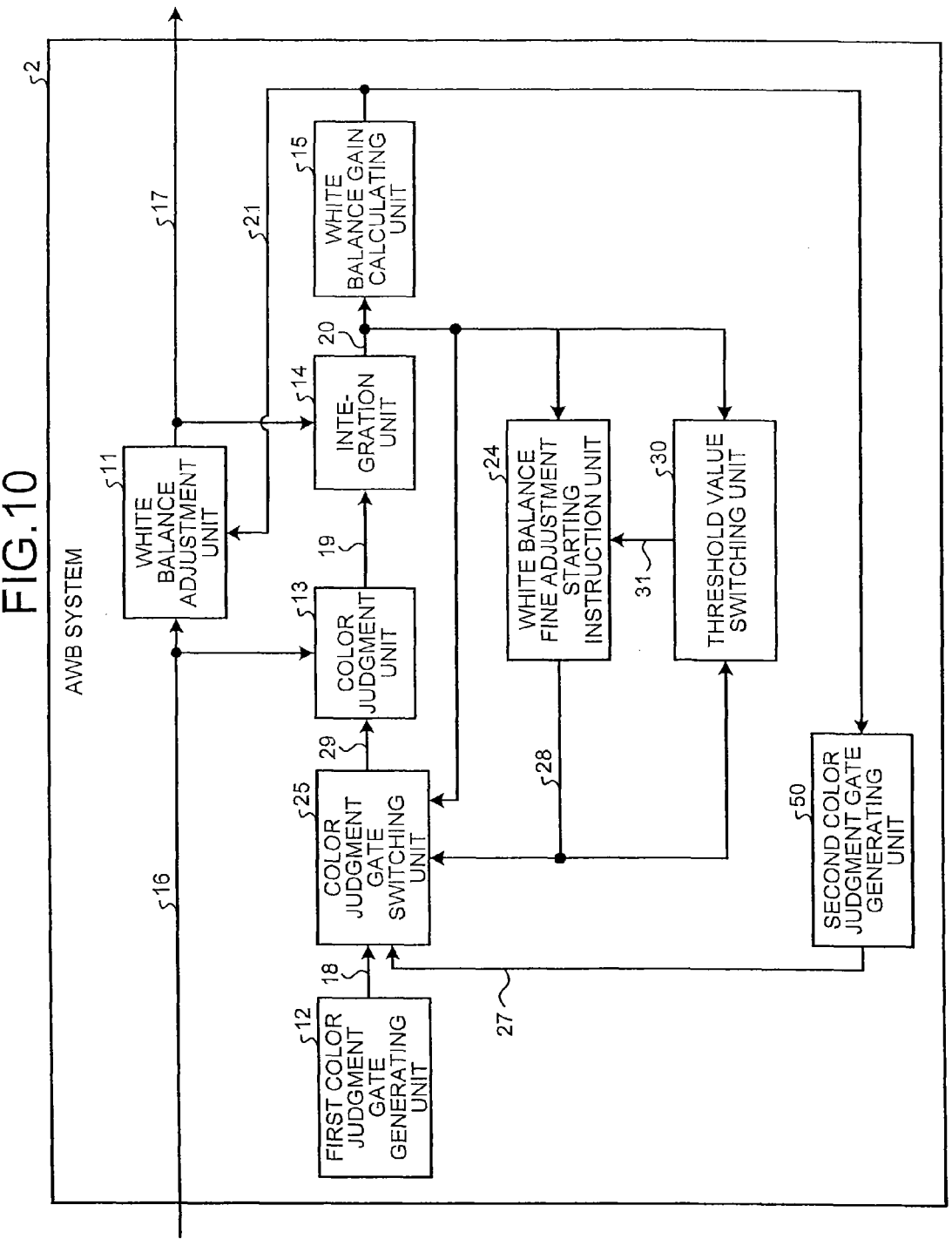
FIG. 10 is a block diagram illustrating a configuration of an AWB system according to a second embodiment.

In addition, the threshold value switching unit 30 may multiply or add the first threshold value Th1 and a value varying with an amount of change in the integration data 20 due to the switching from the first color judgment gate to the second color judgment gate performed by the color judgment gate switching unit 25. The AWB system 1 automatically generates the second threshold value Th2 which is appropriately extended with respect to the first threshold value Th1 to be used for the determination of the white balance fine adjustment starting instruction unit 24. Further, in a case where the second threshold value Th2 is obtained by calculation, it is assumed that the second threshold value Th2 may include the same value as the first threshold value Th1. FIG. 10 is a block diagram illustrating a configuration of an AWB system according to a second embodiment. An AWB system 2 according to the second embodiment includes a white balance adjustment unit 11, a first color judgment gate generating unit 12, a color judgment unit 13, an integration unit 14, a white balance gain calculating unit 15, a white balance fine adjustment starting instruction unit 24, a color judgment gate switching unit 25, a threshold value switching unit 30, and a second color judgment gate generating unit 50. The second color judgment gate generating unit 50 is provided instead of the second color judgment gate generating unit 23 and the light source identifying unit 22 (see FIG. 2) in the first embodiment. The same components as those in the first embodiment will be denoted by the same reference numerals, and the redundant descriptions will not be repeated. The second color judgment gate generating unit 50 generates the second color judgment gate in advance with respect to the light source which is set as a reference. In addition, the second color judgment gate generating unit 50 changes the range of the color temperature of the generated second color judgment gate according to the white balance gain 21. The color judgment gate switching unit 25 detects that the light source has been changed, based on the change in the integration data 20. When it is detected that the light source is changed after the adjustment in the white balance is switched to the fine adjustment in which the second color judgment gate is set as a reference, the color judgment gate switching unit 25 performs the switching to the adjustment, in which the first color judgment gate is set as a reference, to perform a readjustment operation for the white balance.

Figure 11:
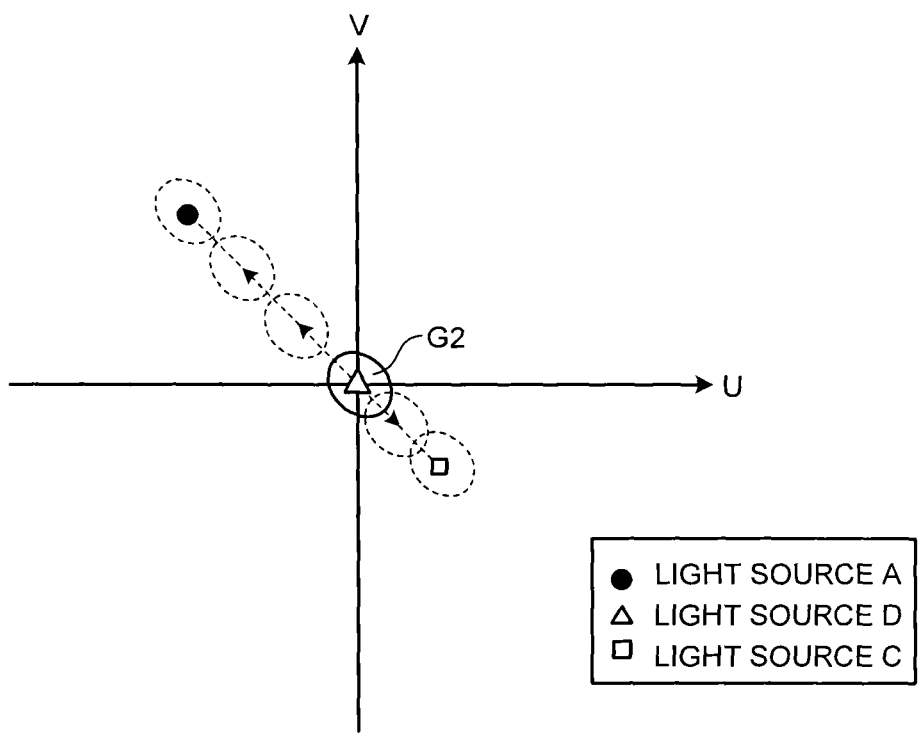
FIG. 11 is a diagram for explaining the change in the second color judgment gate.

Thereafter, the AWB system 2 identifies the light source through the white balance adjustment in which the first color judgment gate is set as a reference, and makes a transition to the fine adjustment in which the white balance is performed based on the second color judgment gate. Further, even in the first embodiment, the color judgment gate switching unit 25 may perform the readjustment operation of the white balance according to the change in the integration data 20 similarly to the second embodiment. FIG. 11 is a diagram for explaining the change in the second color judgment gate. As for the second color judgment gate serving as a reference, the second color judgment gate generating unit 50, for example, generates a second color judgment gate G2 in the range which is set with the light source color of Light source D as the center. The second color judgment gate generating unit 50 shifts the second color judgment gate G2 continuously from the range of which the center is the light source color of Light source C to the range of which the center is the light source color of Light source A according to the white balance gain 21. The AWB system 2 enables the fine adjustment in the white balance to be performed for every assumed light source, and moreover to be performed based on the second color judgment gate G2 which corresponds to an intermediate color temperature among the light source colors thereof. Since the AWB system 2 is operated in correspondence with any color temperature and excludes color regions other than the corresponding color temperature, the white balance adjustment can be performed with high accuracy. The AWB system 2 can be configured to have a small memory scale compared with a case where the second color judgment gate corresponding to a plurality of the light sources is held.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An auto white balance adjustment system in a processor, the system configured to comprise:
   a white balance adjustment unit which performs white balance adjustment on an image signal based on a white balance gain;
   a color judgment unit which performs color judgment targeting the image signal to sort pixel data used for calculating the white balance gain;
   an integration unit which integrates the sorted pixel data by the color judgment unit and outputs the integration data;
   a first color judgment gate generating unit which generates a first color judgment gate to define an entire range of a target color temperature of the white balance adjustment;
   a second color judgment gate generating unit which generates a second color judgment gate to define a range of a target color temperature of the white balance adjustment with respect to each light source identified according to the white balance gain;
   a white balance fine adjustment starting instruction unit which makes an instruction to start fine adjustment in white balance in which the second color judgment gate is a reference for the color judgment; and
   a color judgment gate switching unit which performs the switching of the reference for the color judgment in the color judgment unit from the first color judgment gate to the second color judgment gate in response to the instruction caused by the white balance fine adjustment starting instruction unit,
   wherein the white balance fine adjustment starting instruction unit determines whether to start the fine adjustment depending on a comparison result of the integration data with a first threshold value which is set for the white balance adjustment based on the first color judgment gate, and determines whether to keep on performing the fine adjustment depending on a comparison result of the integration data with a second threshold value which is set for the fine adjustment based on the second color judgment gate.

2. The auto white balance adjustment system according to claim 1,
   wherein the second threshold value is a value larger than the first threshold value.

3. The auto white balance adjustment system according to claim 1, further configured to comprise:
   a threshold value switching unit which performs the switching between the first threshold value and the second threshold value and outputs the switched value to the white balance fine adjustment starting instruction unit in response to the instruction caused by the white balance fine adjustment starting instruction unit.

4. The auto white balance adjustment system according to claim 3,
   wherein the threshold value switching unit outputs the first threshold value and the second threshold value which are predetermined.

5. The auto white balance adjustment system according to claim 3,
   wherein the threshold value switching unit obtains the second threshold value by calculation using the predetermined first threshold value.

6. The auto white balance adjustment system according to claim 3,
   wherein the threshold value switching unit calculates the second threshold value based on an amount of change in the integration data due to the switching from the first color judgment gate to the second color judgment gate in the color judgment gate switching unit.

7. The auto white balance adjustment system according to claim 1, further configured to comprise:
   a light source identifying unit which identifies the light source in capturing an image according to the white balance gain,
   wherein the second color judgment gate generating unit generates the second color judgment gate for each light source which is identified by the light source identifying unit.

8. The auto white balance adjustment system according to claim 1,
   wherein the second color judgment gate generating unit generates the second color judgment gate in advance with respect to the light source set as a reference, and changes the range of the color temperature of the second color judgment gate according to the white balance gain.

9. The auto white balance adjustment system according to claim 8,
   wherein the second color judgment gate generating unit is able to continuously shift the range of the color temperature of the second color judgment gate.

10. An auto white balance adjustment method performed in a processor, comprising:
    performing white balance adjustment on an image signal based on a white balance gain;
    performing color judgment targeting the image signal to sort pixel data used for calculating the white balance gain;
    integrating the sorted pixel data through the color judgment and outputting the integration data;
    generating a first color judgment gate to define an entire range of a target color temperature of the white balance adjustment;
    generating a second color judgment gate to define a range of a target color temperature of the white balance adjustment with respect to each light source identified according to the white balance gain;
    outputting a white balance fine adjustment starting signal which makes an instruction to start fine adjustment in white balance in which the second color judgment gate is a reference for color judgment; and
    switching the reference for the color judgment from the first color judgment gate to the second color judgment gate according to the white balance fine adjustment starting signal,
    wherein whether to start the fine adjustment is determined depending on a comparison result of the integration data with a first threshold value which is set for the white balance adjustment based on the first color judgment gate, and whether to keep on performing the fine adjustment is determined depending on a comparison result of the integration data with a second threshold value which is set for the fine adjustment based on the second color judgment gate.

11. The auto white balance adjustment method according to claim 10,
    wherein the second threshold value is a value larger than the first threshold value.

12. The auto white balance adjustment method according to claim 10, further comprising
    switching the first threshold value and the second threshold value according to the white balance fine adjustment starting signal.

13. The auto white balance adjustment method according to claim 12,
    wherein the first threshold value and the second threshold value are predetermined.

14. The auto white balance adjustment method according to claim 12,
    wherein the second threshold value is obtained by calculation using the predetermined first threshold value.

15. The auto white balance adjustment method according to claim 12,
    wherein the second threshold value is calculated based on an amount of change in the integration data due to the switching from the first color judgment gate to the second color judgment gate.

16. The auto white balance adjustment method according to claim 10, further comprising
    identifying the light source in capturing an image according to the white balance gain,
    the second color judgment gate is generated for each light source which is identified.

17. The auto white balance adjustment method according to claim 10,
    wherein the second color judgment gate is generated in advance with respect to the light source set as a reference, and the range of the color temperature of the second color judgment gate is changed according to the white balance gain.

18. The auto white balance adjustment method according to claim 17,
    wherein the range of the color temperature of the second color judgment gate is able to be continuously shifted.

19. A camera module comprising:
    a lens unit which receives light from an object to form an object image;
    an image sensor which captures the object image; and
    a processor including an auto white balance adjustment system which performs white balance adjustment on an image signal obtained by capturing the image in the image sensor,
    wherein the auto white balance adjustment system is configured to include:
    a white balance adjustment unit which performs white balance adjustment on the image signal based on a white balance gain,
    a color judgment unit which performs color judgment targeting the image signal to sort pixel data used for calculating the white balance gain,
    an integration unit which integrates the sorted pixel data by the color judgment unit and outputs the integration data,
    a first color judgment gate generating unit which generates a first color judgment gate to define an entire range of a target color temperature of the white balance adjustment,
    a second color judgment gate generating unit which generates a second color judgment gate to define a range of a target color temperature of the white balance adjustment with respect to each light source identified according to the white balance gain,
    a white balance fine adjustment starting instruction unit which makes an instruction to start fine adjustment in white balance in which the second color judgment gate is a reference for color judgment, and
    a color judgment gate switching unit which performs the switching of the reference for the color judgment in the color judgment unit from the first color judgment gate to the second color judgment gate in response to the instruction caused by the white balance fine adjustment starting instruction unit, and wherein the white balance fine adjustment starting instruction unit determines whether to start the fine adjustment depending on a comparison result of the integration data with a first threshold value which is set for the white balance adjustment based on the first color judgment gate, and determines whether to keep on performing the fine adjustment depending on a comparison result of the integration data with a second threshold value which is set for the fine adjustment based on the second color judgment gate.

20. The camera module according to claim 19, wherein the second threshold value is a value larger than the first threshold value.

* * * * *